United States Patent [19]

Oishi et al.

[11] Patent Number: 4,825,320
[45] Date of Patent: Apr. 25, 1989

[54] CLUB MAGNETIC TAPE CASSETTE HAVING A PROTECTIVE LAYER

[75] Inventors: Kengo Oishi; Osamu Suzuki, both of Kanagawa, Japan

[73] Assignee: Fuji Photo Film Co., Ltd., Kanagawa, Japan

[21] Appl. No.: 76,636

[22] Filed: Jul. 23, 1987

[30] Foreign Application Priority Data

Jul. 23, 1986 [JP] Japan .............................. 61-112889[U]
Jul. 28, 1986 [JP] Japan .............................. 61-115519[U]
Jul. 28, 1986 [JP] Japan .............................. 61-115520[U]
Jul. 28, 1986 [JP] Japan .............................. 61-115521[U]
Jul. 28, 1986 [JP] Japan .................................. 61-177179

[51] Int. Cl.$^4$ ............................................. G11B 23/04
[52] U.S. Cl. ..................................... 360/132; 264/259
[58] Field of Search ......................... 360/132; 264/259

[56] References Cited

U.S. PATENT DOCUMENTS 4,061,455 12/1977 Von Holdt .......................... 425/542
4,688,128 8/1987 Shiba et al. .......................... 360/132

*Primary Examiner*—Robert S. Tupper
*Attorney, Agent, or Firm*—Sughrue, Mion, Zinn, Macpeak & Seas

[57] ABSTRACT

The body of a magnetic tape cassette is formed by injection molding of plastic material or the like, and is provided with a protecting film layer on at least a part of the outer surface thereof. The protecting film layer is bonded to the surface of the cassette body simultaneously with the molding of the cassette body by injecting molding material into a cavity of a plastic injection mold with a protecting film material being inserted into the cavity before injection.

10 Claims, 3 Drawing Sheets

CLUB MAGNETIC TAPE CASSETTE HAVING A PROTECTIVE LAYER

BACKGROUND OF THE INVENTION

1. Field of the Invention

This invention relates to a magnetic tape cassette having an improved impact strength and to a method of manufacturing the same.

2. Description of the Prior Art

As is well known, a magnetic tape cassette comprises a cassette body and a pair of reels which are housed for rotation in the cassette body and around which a magnetic tape is wound. The cassette body is usually formed by injection molding of plastic or the like, and a paper or the like bearing thereon a predetermined design is applied to the molded cassette body, or a predetermined design is directly printed on the molded cassette body.

The cassette body can be provided with a predetermined design by injection-molding the cassette body with a transfer film bearing thereon the predetermined design being inserted into the cavity of the injection mold. That is, the transfer film generally comprises a base film, and a releasant layer, an ink layer representing the predetermined design and an adhesive layer laminated on the base film in this order, and when molten resin is injected into the cavity with the transfer film being in the cavity, the transfer film is welded to the molded cassette body. When the base film is peeled after the molded cassette body is removed from the cavity, the ink layer is transferred to the surface of the molded cassette body. This method is advantageous over the methods described above in that the cassette body can be provided with a design simultaneously with the injection-molding of the cassette body.

However, irrespective of how a design is provided on the cassette body, an injection-molded cassette body has poor impact strength and is easily broken by a fall onto the floor or the like. This is especially so when the cassette body is formed of polystyrene resins in order to improve heat resistance of the cassette body for use outdoors.

SUMMARY OF THE INVENTION

In view of the foregoing observations and description, the primary object of the present invention is to provide a magnetic tape cassette having an improved impact strength.

Another object of the present invention is to provide a method of manufacturing a magnetic tape cassette having an improved impact strength.

The magnetic tape cassette in accordance with the present invention is characterized in that the cassette body is formed by injection molding of plastic material or the like, and is provided with a protecting film layer on at least a part of the outer surface thereof, the protecting film layer being bonded to the surface of the cassette body simultaneously with the molding of the cassette body by injecting molten material into a cavity of a plastic injection mold with a protecting film material being inserted into the cavity before injection.

The method of manufacturing the magnetic tape cassette in accordance with the present invention comprises the steps of positioning between opened mold halves a protecting film strip comprising a plurality of protecting film units each of which is stamped to a predetermined shape and which are connected with each other by connecting portions, closing the mold halves so that one of the protecting film units is positioned in place in the cavity defined by the mold halves with the connecting portion adjacent to the protecting film unit sandwiched between the mold halves, and injecting molten material into the cavity.

DESCRIPTION OF THE PREFERRED EMBODIMENTS

Figure 1:
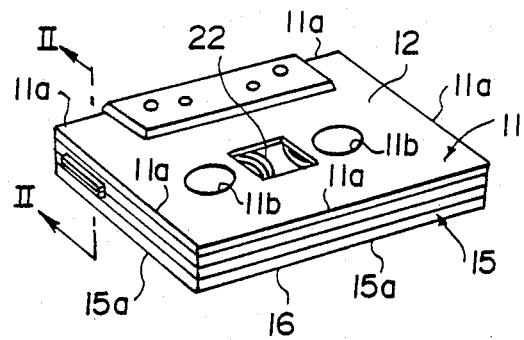
FIG. 1 is a perspective view of a magnetic tape cassette in accordance with an embodiment of the present invention.

In FIG. 1, a magnetic tape cassette in accordance with an embodiment of the present invention comprises a cassette body formed of upper and lower halves 11 and 15, a pair of reels (not shown) supported for rotation in the cassette body, and a magnetic tape 22 wound around the reels. The upper half 11 is provided with a pair of hub portions 11b and the lower half 15 is provided with a pair of hub portions 15b (not shown) respectively opposed to the hub portions 11b of the upper half 11. Each of the reels is supported for rotation by opposed hub portions 11b and 15b. The upper and lower halves 11 and 15 are separately formed by injection molding of plastic.

Figure 2:
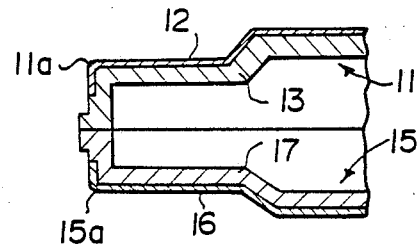
FIG. 2 is a cross-sectional view taken along line II—II in FIG. 1.

As shown in FIG. 2, the halves 11 and 15 comprise base bodies 13 and 17 formed of injection molding material such as plastic, and protecting film layers 12 and 16 attached to the surface of the base bodies 13 and 17. In this particular embodiment, the protecting film layers 12 and 16 are provided to cover the edges of the respective halves 11 and 15. Generally it is preferred that the protecting film layers 12 and 16 be provided to cover at least the edges 11a and 15a of the respective halves 11 and 15.

The upper and lower halves 11 and 15 are formed in a similar manner, and accordingly, a preferred method of forming the upper half 11 will be described by way of example, hereinbelow.

Figure 3:
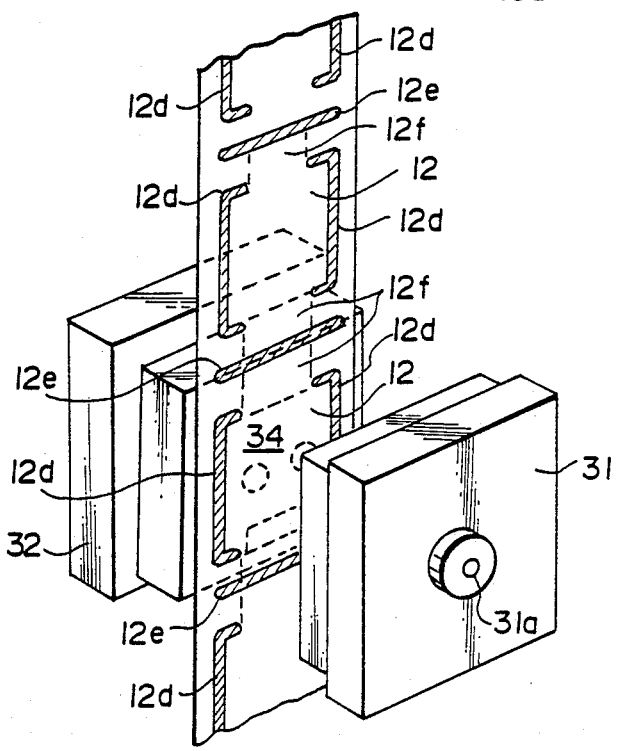
FIG. 3 is a schematic perspective view for illustrating a preferred method of manufacturing the magnetic tape cassette shown in FIG. 1.
Figure 4:
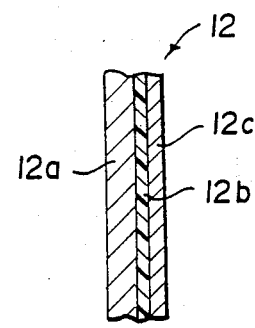
FIG. 4 is a cross-sectional view showing the structure of the protecting film layer of the cassette shown in FIG. 1.

The upper half 11 is injection-molded by use of a mold comprising a stationary mold half 31 and a movable mold half 32 as shown in FIG. 3. With the mold being opened, i.e., the mold halves 31 and 32 being spaced from each other, a protecting film strip comprising a plurality of protecting film units 12 is positioned between the mold halves 31 and 32. The protecting film strip consists of a base film 12a and an ink layer 12b and an adhesive layer 12c superposed on the base film 12a in this order. The ink layer 12b is formed in a pattern representing a predetermined design to be provided on the upper half 11. The base film 12a is generally of polymeric material such as polyethylene, polyethylene terephthalate, polypropylene, triacetate cellulose and the like.

As shown in FIG. 3, the protecting film strip comprises a plurality of protecting film units 12 connected in series. That is, each protecting film unit 12 is defined by a pair of channel shaped openings 12d formed in a protecting film roll by stamping. Adjacent protecting film units 12 are connected by a connecting portion 12f and a partition opening 12e is formed at the middle of the connecting portion 12f to extend in the transverse direction of the protecting film roll.

Figure 5:
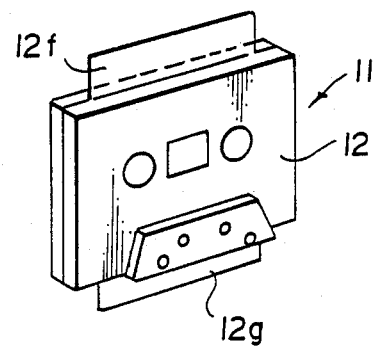
FIG. 5 is a perspective view showing an upper half of the cassette body of the cassette shown in FIG. 1 as it is ejected from the injection mold.

The protecting film strip is first positioned between the stationary mold half 31 and the movable mold half 32 so that one of the film units 12 is positioned i place with respect to the cavity 34 to be defined by the mold halves 31 and 32 when the mold is closed with the adhesive layer 12 facing the stationary mold half 31. Then the movable mold half 32 is moved toward the stationary mold half 31 to close the mold, thereby sandwiching the upper and lower connecting portions 12f of the film unit 12 between the mold halves 31 and 32, and then injection molding material is injected into the cavity 34 through the sprue 31a of the stationary mold half 31. Upon closure of the mold, the protecting film strip is cut at opposite sides of each connecting portion 12f along the broken lines in FIG. 3, whereby the connecting portions 12f and the film unit 12 are severed from the protecting film strip, and the unit 12 and the connecting portions 12f are sandwiched between the mold halves 31 and 32 in this state. After a predetermined time, the mold is opened and the molded upper half 11 of the cassette body is ejected from the movable mold half 32. In this state, the protecting film unit 12 is bonded to the base body 13 by the adhesive layer 12a. FIG. 5 shows the upper half 11 as it is ejected from the mold. As can be seen from FIG. 5, as the molded upper half 11 is ejected from the mold, the film unit 12 is bonded to the outer surface of the upper half 11 and the connecting portions 12f respectively extend upward and downward from the upper half 11. The connecting portions 12f may either be severed, or be bent along the inner surface of the upper half 11 and bonded thereto.

Since the film unit 12 is pressed against the bottom of the cavity 34 upon injection of injection material into the cavity 34, the connecting portions 12f are apt to be wrinkled. However, the partition opening 12e formed between the connecting portions 12f of the adjacent film units 12 prevents wrinkling in one connecting portion from spreading to the adjacent film unit.

In accordance with the method described above, successive cassette halves having a protecting film layer on the surface thereof can be easily manufactured. Further, by providing an ink layer on the inner surface of the protecting film unit in a designed pattern as in this particular embodiment, a design can be provided on the cassette half simultaneously with the injection molding of the cassette. In this case, the base film 12a must be transparent or semitransparent. This method of providing a design on the cassette body is advantageous over the method in which a transfer film is used in that the provided design is protected by the transparent base film from being scraped off.

In the embodiment described above, the protecting film layer 12 is provided on the cassette halves 11 and 15 to cover substantially the entire area of the outer surface thereof. However, in this case, the protecting film layer must be formed, after injection molding of the cassette half, with a plurality of openings to give access to the hub holes, the reference holes, the capstan holes and the like. This adds to the manufacturing cost of the cassette.

Figure 6:
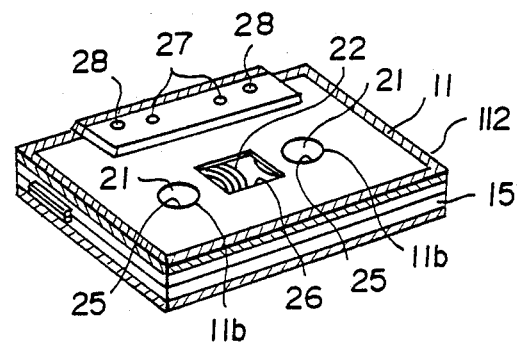
FIG. 6 is a perspective view of a magnetic tape cassette in accordance with another embodiment of the present invention.

Generally, the edges of the cassette body are most prone to breakage when the cassette body falls to the floor or the like. Accordingly, the protecting film layer may be provided to cover only the edges of the cassette body as shown in FIG. 6. In FIG. 6, the cassette of this embodiment is provided with a protecting film layer 112 to cover the edges of the cassette body with the central portion in which the hub holes 25, the transparent window 26, the reference holes 27 and capstan holes 28 open being exposed. When manufacturing the cassette half for this embodiment, the protecting film strip such as shown in FIG. 7 can be used.

Figure 7:
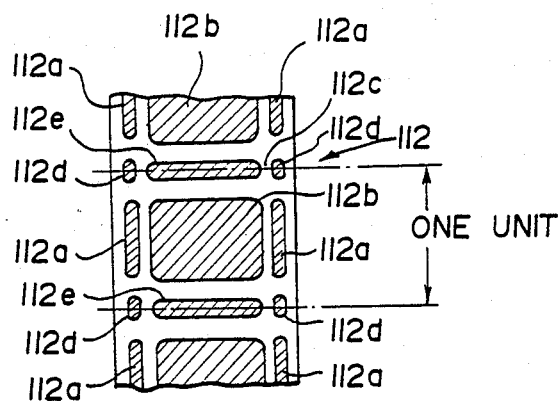
FIG. 7 is a fragmentary front view showing a protecting film strip employed for manufacturing the cassette shown in FIG. 6.

In FIG. 7, the protecting film strip comprises a plurality of protecting film units 112 connected in series. Each protecting film unit 112 is defined by forming a pair of elongated openings 112a on opposite sides of a protecting film roll by tamping, and is provided with a central opening 112b formed by stamping to expose the hub holes 25, the transparent window 26, the reference holes 27 and capstan holes 28. Adjacent protecting film units 112 are connected by a connecting portion 112c narrowed by openings 112d and 112e.

As described above, the base film of the protecting film strip is generally of a polymeric material which is apt to be charged. This fact gives rise to a problem that the protecting film strip is attracted to the mold surface or static discharge is generated between the protecting film strip and the mold surface, thereby adversely affecting feed of the protecting film strip. Further, when the protecting film layer on the cassette body is charged, dust and the like is apt to adhere to the cassette body.

Figure 8:
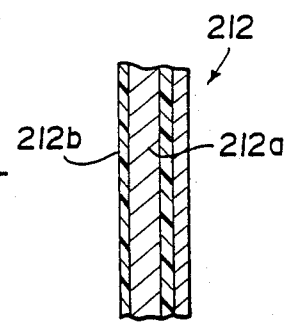
FIG. 8 is a fragmentary cross-sectional view of a protecting film strip which can be used for carrying out the method of the present invention.

Accordingly, it is preferred that a protecting film 212 having an antistatic agent layer 212b on the outer surface of a base film 212a as shown in FIG. 8 be used for preparing the protecting film strip. As the antistatic agent may be used conductive powder such as graphite, carbon black, carbon black-graphite polymer or the like; a natural surface active agent such as saponin or the like; a nonionin surface active agent such as alkylene oxides, glycerins, glycidols, polyols, polyol esters, EO addition polymers of alkylphenols or the like; a cationic surface active agent such as higher alkyl amines, cyclic amines, hydantoin derivatives, amide amines, ester amides, quaternary ammonium salts, heterocyclic compounds like pyridine, phosphonium or the like; an anionic surface active agent having an acid radical such as carboxylic acids, sulfonic acids, phosphoric acids, sulfate radicals, phosphate ester radicals or the like; amino acids; and an amphoteric surface active agent such as amino sulfonic acids, sulfate esters or phosphate esters of amino alcohols or the like.

Figure 9:
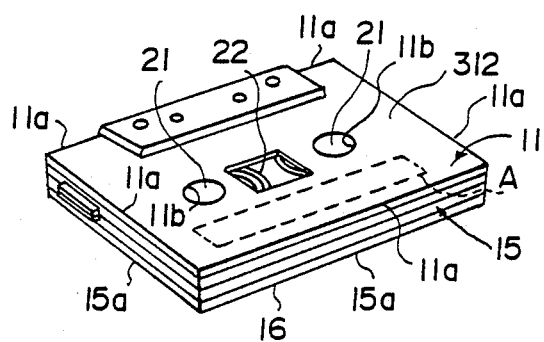
FIG. 9 is a perspective view of a magnetic tape cassette in accordance with still another embodiment of the present invention.
Figure 10:
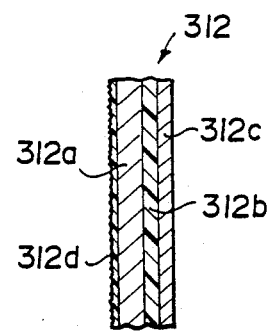
FIG. 10 is a fragmentary cross-sectional view of a protecting film layer provided on the cassette shown in FIG. 9.

In the embodiment shown in FIG. 9, a part of the outer surface of the protecting film layer 312 is processed so that memorandums or the like can be written thereon as shown by the broken line in FIG. 9. This can be accomplished, for instance, by providing on the outer surface of the base film 312a bearing an ink layer 312b and an adhesive layer 312c on the inner surface thereof with a certain ink layer which has been known per se, or by matting the outer surface of the base film 312a as shown in FIG. 10.

With this arrangement, a space for writing recording contents or the like can be formed simultaneously with the molding of the cassette body without label application after molding of the cassette body.

We claim:

1. A magnetic tape cassette, comprising: a cassette body; a pair of hubs housed for rotation in said cassette body; a magnetic tape wound around said hubs,
   said cassette body being formed by injection molding of plastic material or the like; and a protective film layer on at least a part of the outer surface thereof, said protective film layer being bonded to the surface of said cassette body simultaneously with the molding of said cassette body by injecting molten material into a cavity of an injection mold with a protective film material being inserted into the cavity before injection.

2. A magnetic tape cassette s defined in claim 1 in which said protective film layer comprises a base film and an adhesive layer formed on the inner surface of the base film.

3. A magnetic tape cassette as defined in claim 2 in which said protective film layer is provided with an ink layer formed between the base film and the adhesive layer in a predetermined designed pattern, the base film being transparent or semitransparent.

4. A magnetic tape cassette as defined in claim 2 or 3 in which at least a part of the outer surface of said base film is processed before injection so that memorandums or the like can be written thereon.

5. A magnetic tape cassette as defined in claim 4 in which at least a part of the outer surface of said base film is matted.

6. A magnetic tape cassette as defined in claim 4 in which said base film is provided with an antistatic agent layer formed on the outer surface before injection.

7. A magnetic tape cassette as defined in claim 2 or 3 in which said base film is provided with agent layer formed on the outer surface before injection.

8. A magnetic tape cassette as defined in claim 1 in which said protective film layer is shaped before injection not to close openings communicating with the inside of the cassette body.

9. A magnetic tape cassette as defined in claim 1 or 8 in which said protective layer covers at least the edges of the cassette body.

10. A magnetic tape cassette as defined in claim 1 in which said protective film layer is of polymeric material such as polyethylene, polyethylene terephthalate, polypropylene, and triacetate cellulose.

* * * * *